US012210405B2

(12) United States Patent
Dueholm et al.

(10) Patent No.: US 12,210,405 B2
(45) Date of Patent: Jan. 28, 2025

(54) FARM MANAGEMENT SYSTEM, COMPUTER-IMPLEMENTED METHOD, COMPUTER PROGRAM AND NON-VOLATILE DATA CARRIER

(71) Applicant: DeLaval Holding AB, Tumba (SE)

(72) Inventors: Anders Dueholm, Tumba (SE); Erik Lundkvist, Tumba (SE)

(73) Assignee: DeLaval Holding AB, Tumba (SE)

( * ) Notice: Subject to any disclaimer, the term of this patent is extended or adjusted under 35 U.S.C. 154(b) by 163 days.

(21) Appl. No.: 18/013,206

(22) PCT Filed: Jun. 18, 2021

(86) PCT No.: PCT/SE2021/050601
§ 371 (c)(1),
(2) Date: Dec. 27, 2022

(87) PCT Pub. No.: WO2022/005364
PCT Pub. Date: Jan. 6, 2022

(65) Prior Publication Data
US 2023/0281067 A1    Sep. 7, 2023

(30) Foreign Application Priority Data
Jun. 29, 2020 (SE) .................... 2050788-5

(51) Int. Cl.
*G06F 11/07* (2006.01)
*G06F 11/32* (2006.01)
*G08B 21/18* (2006.01)

(52) U.S. Cl.
CPC ........ *G06F 11/0775* (2013.01); *G06F 11/327* (2013.01); *G08B 21/182* (2013.01); *G06F 2201/81* (2013.01)

(58) Field of Classification Search
None
See application file for complete search history.

(56) References Cited

U.S. PATENT DOCUMENTS 8,191,506 B2   6/2012  Caldenius
2006/0287994 A1* 12/2006 George ................... G06F 16/48
707/999.005

(Continued)

FOREIGN PATENT DOCUMENTS

EP   1 212 938   6/2002
EP   2 939 532   11/2015

(Continued)

OTHER PUBLICATIONS

International Search Report dated Aug. 12, 2021, for PCT/SE2021/050601, 3 pp.

(Continued)

*Primary Examiner* — Thomas S McCormack
(74) *Attorney, Agent, or Firm* — NIXON & VANDERHYE

(57) ABSTRACT

A message handling node of a farm management system that receives error messages from a plurality of automatic devices, and generates and sends out error reports to user terminals, where the message handling node applies a rules system prescribing that an error report concerning a particular one of the automatic devices is generated based on fulfillment of a frequency criterion relating to a number of times at which the message handling node receives the error messages from said particular one device within at least one previous period in order to manage a total number of error reports received by each of the user terminals.

23 Claims, 3 Drawing Sheets

(56) References Cited

U.S. PATENT DOCUMENTS

2009/0145363 A1\* 6/2009 Caldenius ............... A01J 5/007
                                                         119/14.08
2013/0125821 A1   5/2013 Gibbs et al.
2013/0340682 A1  12/2013 Bareket
2018/0150344 A1   5/2018 Kim et al.

FOREIGN PATENT DOCUMENTS

| WO | 2010/071413 | 6/2010 |
| WO | 2014/078960 | 5/2014 |
| WO | 2017/217870 | 12/2017 |
| WO | 2019/245434 | 12/2019 |

OTHER PUBLICATIONS

Written Opinion of the ISA dated Aug. 12, 2021, for PCT/SE2021/050601, 7 pp.
Swedish Search Report dated Apr. 12, 2021, for SE 2050788-5, 3 pp.

\* cited by examiner

FARM MANAGEMENT SYSTEM, COMPUTER-IMPLEMENTED METHOD, COMPUTER PROGRAM AND NON-VOLATILE DATA CARRIER

CROSS-REFERENCE TO RELATED APPLICATIONS

This application is the U.S. national phase of International Application No. PCT/SE2021/050601 filed Jun. 18, 2021, which designated the U.S. and claims priority to SE 2050788-5 filed Jun. 29, 2020, the entire contents of each of which are hereby incorporated by reference.

TECHNICAL FIELD

The present invention relates generally to farm management. Especially, the invention relates to a farm management system and a computer-implemented method for such a system. The invention also relates to a corresponding computer program and a non-volatile data carrier storing such a computer program.

BACKGROUND

Today's automatic milking arrangements are highly complex installations that involve comparatively advanced technical devices. To ensure safe and reliable operation, a modern milking installation must be provided with an automatic supervision system that produces alarms in respect of any detected faulty devices. Such alarms may be indicated locally at the device in question. However preferably, the alarms should also be sent to a remote receiver, such as a mobile terminal, for example a smartphone or a laptop.

U.S. Pat. No. 8,191,506 describes a milking system containing a plurality of apparatuses, wherein each of the apparatuses includes a device for performing an action related to the operation of the milking system, a microprocessor, an error message generating system for generating error messages about errors that have occurred in the apparatus; and means for communicating said error messages to all other ones of the apparatuses. Each of the error messages contains information regarding the nature and severity and optionally physical location of the error and is interpretable by all other ones of the apparatuses.

EP 1 212 938 discloses a farm management system provided with a computer and at least one other automatic farming system such as an animal identification system, a milking device and an automatic feeding device, which is coupled to the computer. Each of the other farming devices is arranged for obtaining and supplying to the computer animal information about an identified animal. The computer is arranged for indicating an animal when the animal information belonging to the respective animal does not meet predetermined standards and/or when, conversely, no animal information meeting predetermined standards is received. The farm management system is further arranged to automatically effect a communication connection with at least one predetermined mobile communication apparatus for sending alarm information to the predetermined apparatus when at least one of the animals is indicated and/or when at least one of the farming systems or the computer generates at least one predetermined error message.

Thus, systems exist for handling error messages in various farm environments. Although the existing systems may be very useful problematic scenarios may arise. Namely, in many cases, the number of error messages sent out becomes overwhelming for the recipients of these messages. Actually, it is not unusual that certain kinds of error messages are generated in the range of thousands per day. Of course, it is practically impossible for a user to acquire any sensible information from such an amount of error messages. It is therefore an obvious risk that a critical error message is drowned in countless less important error messages.

SUMMARY

The object of the present invention is therefore to offer a solution that mitigates the above problems and provides an efficient handling of error messages in a farm environment.

According to one aspect of the invention, the object is achieved by a farm management system including a message handling node. The message handling node, in turn, is configured to: receive error messages from a number of automatic devices; generate at least one error report based on the received error messages; and send the at least one error report to at least one user terminal. Specifically, the message handling node is configured to generate the at least one error report of a basic or auxiliary type by applying a rules system prescribing that the at least one error report in respect of a particular one of the automatic devices be generated based on the fulfillment of a frequency criterion relating to a number of times at which the message handling node receives the error messages from said particular one automatic device within at least one previous period. For example, when receiving a first error message of a first type from the particular one automatic device, the message handling node may be configured to check if the frequency criterion is fulfilled by comparing a first cumulative count of error messages of the first type received from the particular one automatic device during a first previous period with a first cumulative count threshold. If the first cumulative count exceeds the first cumulative count threshold, the message handling node is configured to send the at least one error report indicating that the first cumulative count threshold has been exceeded by error messages of the first type from said particular one automatic device.

The above system is advantageous because it allows for a highly flexible forwarding of error information. The user may tailor the manner in which he/she receives error reports either on a very general level, so that for example all error messages below a particular number per unit time are filtered out; or very specifically on a per-device per-error-type level, so that for example certain types of error messages below a particular number per unit time are filtered out, whereas error messages from identified devices always come through regardless of their frequency.

According to one embodiment of this aspect of the invention, when receiving a first error message of a first type from the particular one automatic device, the message handling node is configured to check if the frequency criterion is fulfilled by comparing a first cumulative count of error messages of the first type received from the particular one automatic device during a first previous period with a first cumulative count threshold. Only if the first cumulative count exceeds the first cumulative count threshold, the message handling node is configured to send the at least one error report indicating that the first cumulative count threshold has been exceeded by error messages of the first type from the particular one automatic device. As a result, the user will not receive any error messages at all in respect of the particular one automatic device of the first type before a given number of error messages have been generated, say 10, 100 or 1000 depending on the user's preferences and the duration of the first period.

According to another embodiment of this aspect of the invention, if the first cumulative count exceeds the first cumulative count threshold at a first point in time, the message handling node is instead configured to, after the first point in time send the at least one error report of the auxiliary type indicating that the cumulative count of error messages of the particular type has been received from the particular one automatic device during a second previous period, where the at least one error report of the auxiliary type is sent only at predefined points in time. Consequently, the user will receive all error messages in respect of the particular one automatic device up until a given number of error messages have been generated, say 10, 100 or 1000 depending on the user's preferences and the duration of the first period. However, after that, the user will only receive error reports of the auxiliary type. Thus, he/she will not risk being drowned in error messages. Yet, if only relatively few error messages are produced, he/she will not risk missing these either.

The message handling node may be configured to set the abovementioned first cumulative count threshold dynamically based on a time parameter, such that a duration of the first previous period is different at different times of the day. Thereby, the filtering of error messages can vary over the day, for instance depending on the specific activities in the farm.

According to yet another embodiment of this aspect of the invention, the particular one automatic device belongs to a first category of devices, say ear tags. The message handling node is here configured to check if the frequency criterion is fulfilled by comparing the first cumulative count of error messages of the first type, e.g. related to low battery, received from a further automatic device belonging to a second category of devices, say activity meters, during the first previous period with a second cumulative count threshold. If the first cumulative count exceeds the second cumulative count threshold, the message handling node is configured to send the at least one error report indicating that the second cumulative count threshold has been exceeded by error messages of the first type from said further automatic device. This means that for example error reports relating to low battery can be treated differently depending on whether they relate to ear tags or activity meters. Of course, the automatic device of the first and second categories may also be of identical types, so that the categorization is purely administrative. For instance, the first category may define the activity meters of a first group of animals, and the second category may define the activity meters of a second group of animals.

According to still another embodiment of this aspect of the invention, the message handling node is configured to check if the frequency criterion is fulfilled by comparing a sum of the first cumulative counts of the error messages of the first type received from said particular automatic device and said further automatic device during the first previous period with a third cumulative count threshold. This third cumulative count threshold is different from a combined magnitude of the first and second cumulative count thresholds, i.e. the third cumulative count threshold may either be higher than or lower than the sum of the first cumulative counts in respect of the particular and further automatic devices. In any case, if said sum of the first cumulative counts exceeds the third cumulative count threshold, the message handling node is configured to send the at least one error report indicating that the third cumulative count threshold has been exceeded by error messages of the first type from said particular automatic device and said further automatic device. This is beneficial because it enables supervision of various combinatory effects of errors. For example, for each individual device a certain amount of errors can be tolerated per unit time. However, an acceptable combined amount of errors in two or more devices may be lower than the sum of the acceptable individual number of errors in these devices.

According to another embodiment of this aspect of the invention, the message handling node is configured to analyze the received error messages, which error messages represent at least two different types of error messages and/or have been received from at least two different automatic devices to determine an estimated cause of a combination of at least two of said at least two the error messages. The message handling node is further configured to present the estimated cause in the at least one error report of the auxiliary type. Such an analysis can be made by studying a consecutive order in which different error messages occur and/or by studying how various combinations of error messages occur. For example, a vacuum-sensor error occurring in conjunction with a teat-cup-attachment error may indicate a faulty vacuum pressure level.

According to a further embodiment of this aspect of the invention, the rules system prescribes that a subgroup of the error messages pertains to critical alarms. If the message handling node receives an error message in this subgroup, the message handling node is configured to send out the at least one error report with an indication of the critical alarm to which the error message pertains irrespective of whether the frequency criterion is fulfilled relating to a number of times per unit time the message handling node receives said error message in said subgroup. In other words, the critical alarms always pass through to the receiving user terminal(s).

According to still another embodiment of this aspect of the invention, the message handling node is configured to check if an emergency criterion is fulfilled by comparing the first cumulative count of error messages of the first type received from the particular one automatic device during the first previous period with an emergency cumulative count threshold above the first cumulative count threshold. If the first cumulative count exceeds the emergency cumulative count threshold, the message handling node is configured to send the at least one error report indicating that the emergency cumulative count threshold has been exceeded by error messages of the first type from said particular one automatic device. Thus, an emergency alarm may be triggered when a total volume of error messages has been reached.

According to another embodiment of this aspect of the invention, the system further includes a control node, which is configured to: receive the at least one error report; generate at least one statistic report based on the at least one error report; and store the at least one statistic report in a digital storage resource. The control node thus maintains a record over various error reports generated over time. Inter alia, this may constitute a basis for future maintenance of the farm devices.

Preferably, the control node is configured to receive at least one programming command. In response to the at least one programming command the control node is further configured to generate at least one rule adjustment instruction, and send the at least one rule adjustment instruction to the message handling node. The at least one rule adjustment instruction, in turn, is configured to alter the rules system that is applied to the error messages received in the message handling node. Hence, the user may alter the error-filtering function in a straightforward manner.

According to another aspect of the invention, the object is achieved by a computer-implemented method performed in a farm management system. The method involves receiving error messages from a number of automatic devices; generating at least one error report based on the received error messages; and sending the at least one error report to at least one user terminal. Specifically, the at least one error report is generated by applying a rules system prescribing that the at least one error report in respect of a particular one automatic device be generated based on the fulfillment of a frequency criterion relating to number of times at which the error messages from the particular one automatic device are received within at least one previous period. The advantages of this method, as well as the preferred embodiments thereof, are apparent from the discussion above with reference to the system.

According to a further aspect of the invention, the object is achieved by a computer program loadable into a non-volatile data carrier communicatively connected to a processing unit. The computer program includes software for executing the above method when the program is run on the processing unit.

According to another aspect of the invention, the object is achieved by a non-volatile data carrier containing the above computer program.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION

Figure 1:
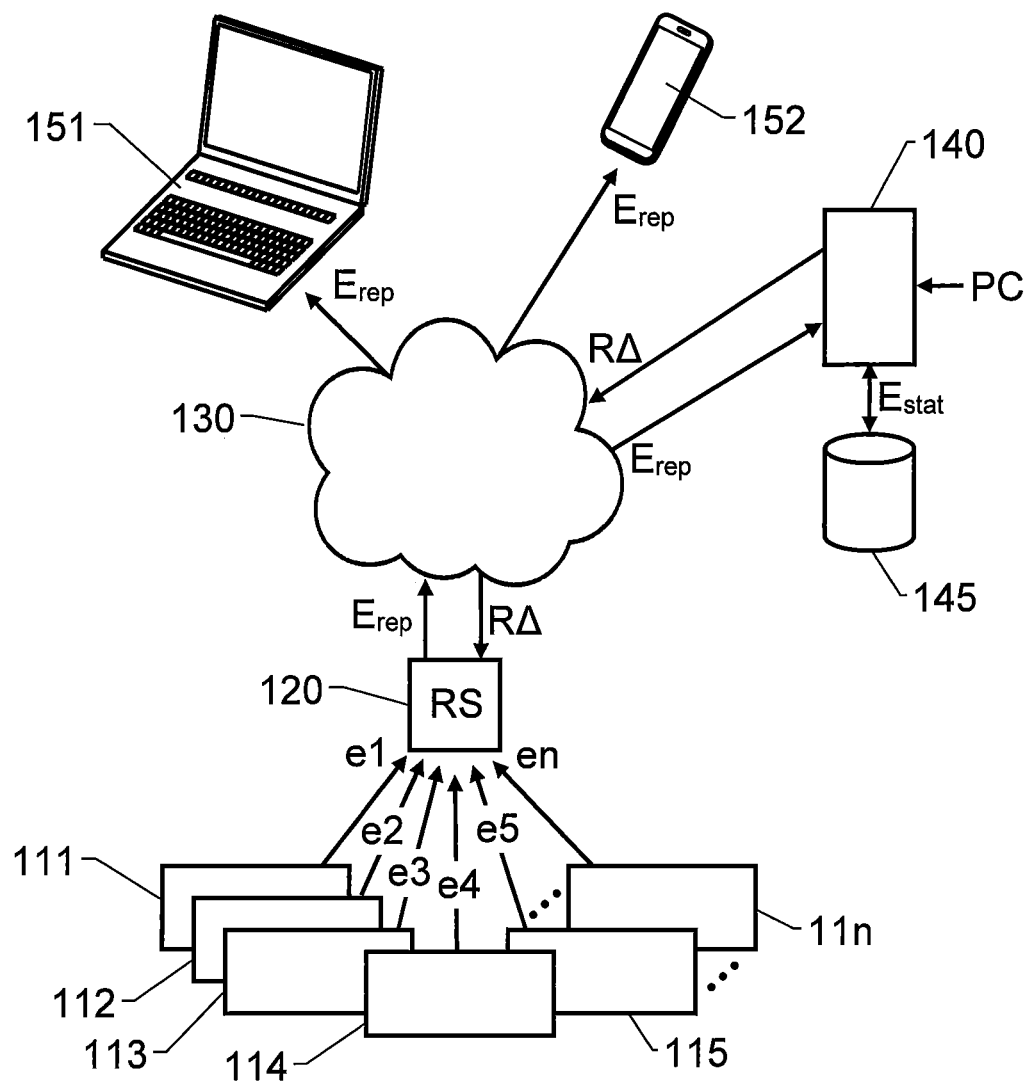
FIG. 1 shows a farm management system according to one embodiment the invention.

FIG. 1 shows a farm management system according to one embodiment the invention. The farm management system contains a message handling node 120. According to one embodiments of the invention, the farm management system also contains a control node 140.

The message handling node 120 is configured to receive error messages e1, e2, e3, e4, e5, . . . , en from a number of automatic devices, here symbolically illustrated by boxes 111, 112, 113, 114, 115 and 11n respectively.

The main task of the message handling node 120 is to filter the received error messages e1, e2, e3, e4, e5, . . . , en, so that end recipients in the form of user terminals, here exemplified by a laptop computer 151 and a smartphone 152 respectively, receive a reasonable number of error indications in a perspicuous manner. The user terminals 151 and 152 can be handled by a farmer, a service technician, a member of administrative staff etc. and are preferably connected to the message handling node 120 via a respective wireless interface and at least one interconnecting network 130, such as the Internet.

Based on the received error messages e1, e2, e3, e4, e5 and en, the message handling node 120 is configured to generate at least one error report of a basic type BSC or an auxiliary type AUX, here exemplified by $E_{rep}$, and send these error reports $E_{rep}$ to the user terminal(s) 151 and/or 152 respectively depending on which end recipient(s) that is/are registered in the message handling node 120. The message handling node 120 is configured to generate the at least one error report $E_{rep}$ of the basic or auxiliary type BSC/AUX by applying a rules system RS. The rules system RS may define a number of criteria for how and when the error report(s) $E_{rep}$ of the basic or auxiliary type BSC/AUX shall be issued. In any case, the rules system RS prescribes that the at least one error report $E_{rep}$ of the basic or auxiliary type BSC/AUX in respect of a particular one of the automatic devices, say 111, be generated based on the fulfillment of a frequency criterion relating to a number of times at which the message handling node 120 receives the error messages e1 from the particular one device 111 within a first previous period P1.

Figure 2:
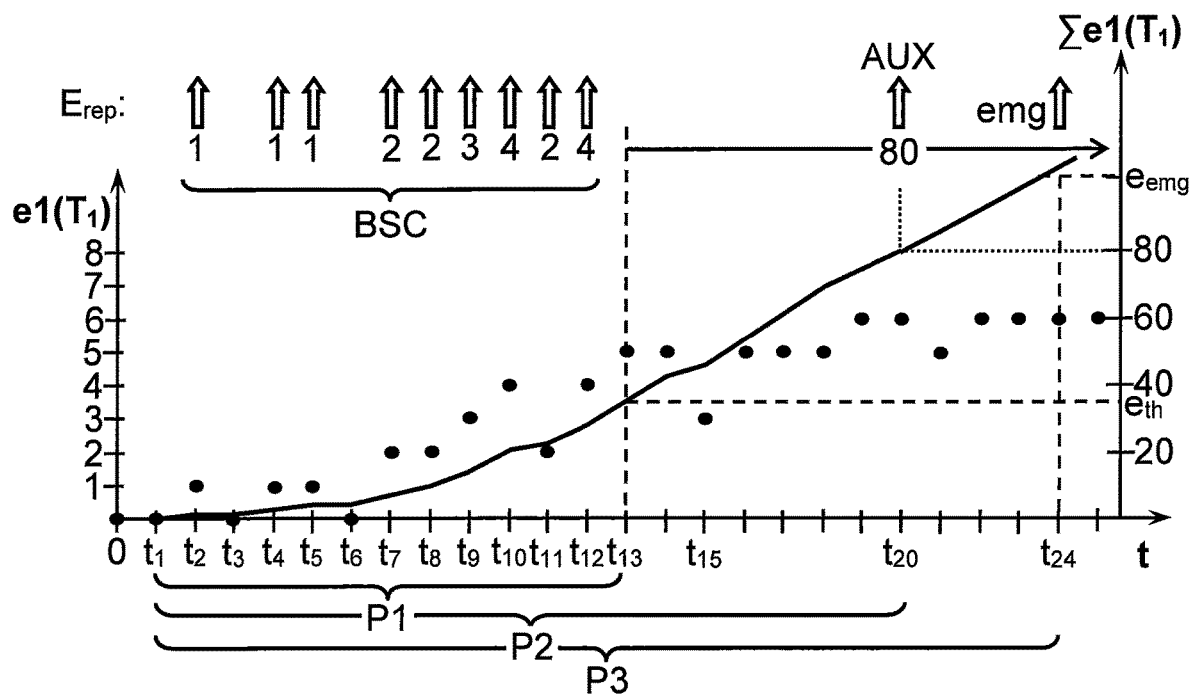
FIGS. 2-3 show diagrams illustrating how alarms may be handled according to embodiments of the invention.

FIG. 2 shows a diagram illustrating how first error messages $e1(T_1)$ of a first type $T_1$ received from the particular one device 111 may serve as a basis for generating the error reports $E_{rep}$ of the basic or auxiliary type BSC/AUX according to one embodiment of the invention. The diagram represents an instant count of error messages $e1(T_1)$ as dots with respect to a vertical axis on the left hand side, a cumulative count of error messages $\Sigma e1(T_1)$ as a graph with respect to a vertical axis on the right hand side, and time t along the horizontal axis.

Preferably, when receiving the first error message e1 of the first type $T_1$ from the particular one device 111, the message handling node 120 is configured to check if the frequency criterion is fulfilled by comparing the first cumulative count $\Sigma e1(T_1)$ of error messages of the first type $T_1$ received from the particular one automatic device 111 during the first previous period P1 with a first cumulative count threshold $e_{th}$. The first previous period P1 is a predefined time span, for instance a day, a part of a day, a number of hours etc., since a particular point in time $t_1$.

According to one embodiment of the invention, the message handling node 120 is configured to set the first cumulative count threshold $e_{th}$ dynamically based on a time parameter. This could mean that the duration of the first previous period P1 is set to vary over the day, so that the length of this period is different at different times of the day. For example, in the daytime when the farm devices are relatively busy, the duration of the first previous period P1 may be relatively short; and at night, when many farm devices are inactive, the duration of the first previous period P1 may be relatively long.

If the first cumulative count $\Sigma e1(T_1)$ does not exceed the first cumulative count threshold $e_{th}$, the message handling node 120 is configured to generate at least one error report $E_{rep}$ of the basic type BSC. If the first cumulative count $\Sigma e1(T_1)$ exceeds the first cumulative count threshold $e_{th}$, the message handling node 120 is instead configured to generate at least one error report $E_{rep}$ of the auxiliary type AUX.

In the example illustrated in FIG. 2, the first cumulative count threshold $e_{th}$ is set to 35—a value that is reached by the first cumulative count $\Sigma e1(T_1)$ at a point in time $t_{13}$. As a result, after the point in time $t_{13}$, the message handling node 120 will generate at least one error report $E_{rep}$ of the auxiliary type AUX. For example, this may involve generating an error report $E_{rep}$ of the auxiliary type AUX at a point in time $t_{20}$ indicating the first cumulative count $\Sigma e1(T_1)$ at this point in time, a third period P3 after receiving the first error message at $t_1$. In the example illustrated in FIG. 2, the first error report $E_{rep}$ of the auxiliary type AUX, generated at a point in time $t_{20}$ indicates the first cumulative count $\Sigma e1(T_1)$ to a value of 80. Of course, the first error report $E_{rep}$ of the auxiliary type AUX may equally well be sent at any earlier, or later, time on or after the point in time $t_{13}$, such as at the point in time $t_{13}$.

According to one embodiment of the invention, the at least one error report $E_{rep}$ of the basic type BSC indicates an instant first count $e1(T_1)$. I.e. in the example illustrated in FIG. 2, at points in time $t_2$, $t_4$ and $t_5$ the error report $E_{rep}$ of the basic type BSC indicates an instant first count $e1(T_1)$ of 1; at points in time $t_7$, $t_8$ and $t_{11}$ the error report $E_{rep}$ of the basic type BSC indicates an instant first count $e1(T_1)$ of 2; at a point in time $t_9$ the error report $E_{rep}$ of the basic type BSC indicates an instant first count $e1(T_1)$ of 3; and at points in time $t_{10}$ and $t_{12}$ the error report $E_{rep}$ of the basic type BSC indicates an instant first count $e1(T_1)$ of 4.

The message handling node 120 may further be configured to determine if such an amount of error messages of a particular type has been received that an emergency criterion is fulfilled, i.e. a very large number of errors have occurred. Therefore, according to one embodiment of the invention, the message handling node 120 is configured to check if the emergency criterion is fulfilled by comparing the first cumulative count $\Sigma e1(T_1)$ of error messages of the first type $T_1$ received from the particular one device 111 during the first previous period P1 with an emergency cumulative count threshold $e_{emg}$. The emergency cumulative count threshold $e_{emg}$ is above, preferably substantially above, the first cumulative count threshold $e_{th}$, say a factor 10, 100, 1000 or 10 000, or for example any number between 10 and 100 000. For reasons of clarity, in FIG. 2, the first cumulative count threshold $e_{th}$ is set to a value of 35 and the emergency count threshold $e_{emg}$ is set a value of 100. Typically, the first cumulative count threshold $e_{th}$ and the emergency count threshold $e_{emg}$ are set depending on the type of automatic device and the type of error.

Figure 3:
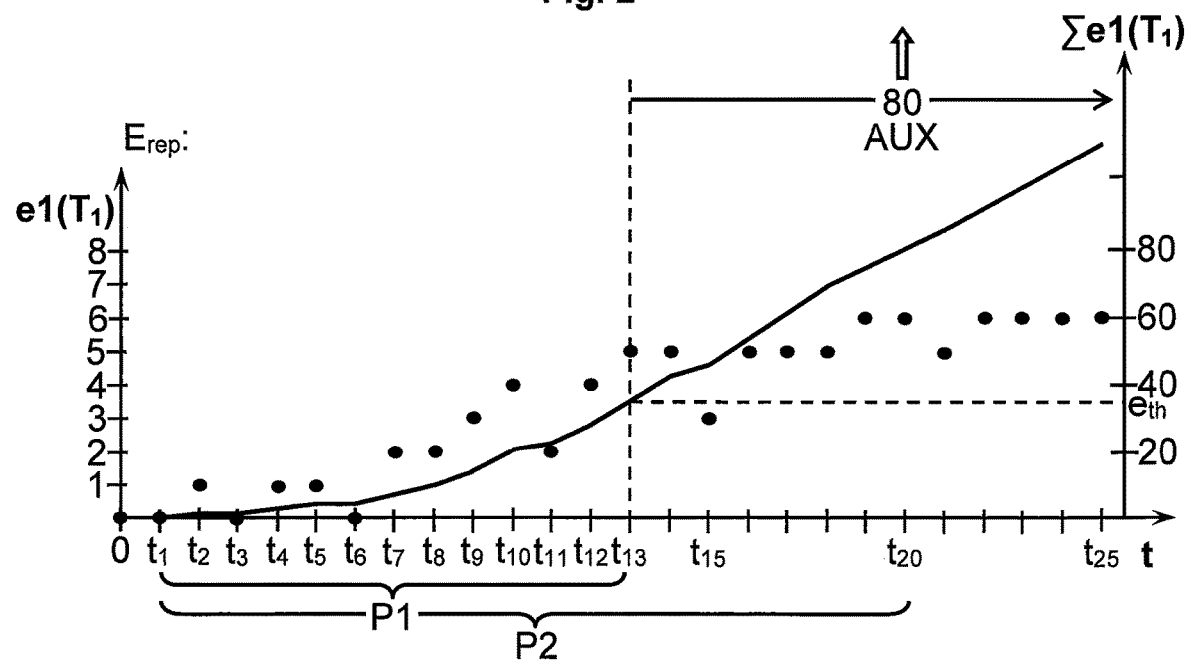

If the first cumulative count $\Sigma e1(T_1)$ exceeds the emergency cumulative count threshold $e_{emg}$, the message handling node 120 is configured to send the error report $E_{rep}$ to the user terminal(s) 151 and/or 152, where the error report $E_{rep}$ indicates that the emergency cumulative count threshold $e_{emg}$ has been exceeded by error messages of the first type $T_1$ from said particular one device 111. As is apparent from the example in FIG. 2, the emergency cumulative count threshold $e_{emg}$ is probably exceeded sometime between a point in time $t_{23}$ and a point in time $t_{24}$. However, it is first at the point in time $t_{24}$ the message handling node 120 receives an error report $e1$ indicating such an instant count of error messages $e1(T_1)$, here 6, that the first cumulative count $\Sigma e1(T_1)$ exceeds the emergency cumulative count threshold $e_{emg}$. Referring now to FIG. 3, we see a diagram illustrating another embodiment of the invention. As in FIG. 2, the diagram represents the instant count of error messages $e1(T_1)$ as dots with respect to a vertical axis on the left hand side, the cumulative count of error messages $\Sigma e1(T_1)$ as a graph with respect to a vertical axis on the right hand side, and time t along the horizontal axis.

In the embodiment illustrated in FIG. 3, in order to minimize the error reporting to the user terminal(s) 151 and/or 152, the message handling node 120 is configured only to send the at least one error report $E_{rep}$ if the first cumulative count $\Sigma e1(1)$ exceeds the first cumulative count threshold $e_{th}$. Exclusively after that the first cumulative count $\Sigma e1(1)$ has exceeded the first cumulative count threshold $e_{th}$ the message handling node 120 will send out at least one error report $E_{rep}$, namely of the auxiliary type AUX indicating that the first count threshold $e_{th}$ has been exceeded by error messages of the first type $T_1$ from said particular one automatic device 111. Thus, up until a point in time $t_{12}$ before the first cumulative count $\Sigma e1(1)$ exceeds the first cumulative count threshold $e_{th}$, the message handling node 120 does not send out any error reports $E_{rep}$ at all, at least not in respect of the first error messages $e1(T_1)$ of the first type $T_1$ received from the particular one device 111.

After that the first count threshold $e_{th}$ has been exceeded, the at least one error report $E_{rep}$ of the auxiliary type AUX, which is sent out by the message handling node 120 indicates that the first cumulative count threshold $e_{th}$ has been exceeded by the error messages of the first type $T_1$ from the particular one automatic device 111 during the first period P1. The at least one error report $E_{rep}$ of the auxiliary type AUX is preferably sent out only at predefined points in time, which in FIG. 3 is exemplified at $t_{20}$. The at least one error report $E_{rep}$ of the auxiliary type AUX preferably also indicates the first cumulative count $\Sigma e1(T_1)$ of error messages received during a second previous period P2 since a reference point in time $t_1$ with respect to which the first previous period P1 is measured, i.e. the basis for determining whether the first cumulative count threshold $e_{th}$ was exceeded. The second previous period P2 preferably represents a predefined time span, for instance a day, a part of a day, a number of hours etc. The at least one error report $E_{rep}$ of the auxiliary type AUX is sent only at predefined points in time, which in FIGS. 2 and 3 is illustrated by means of the at least one error report $E_{rep}$ of the auxiliary type AUX being sent out to the at least one user terminal 151 and/or 152 at a point in time $t_{20}$.

It may be advantageous to organize the automatic devices in two or more category of devices from which categories the error messages are treated differently, i.e. the rules system RS specifies a first set of criteria for a first category of devices within said number of automatic devices 111, 112, 113, 114, 115 and 11n and a second set of criteria for a second category of devices within said number of automatic devices 111, 112, 113, 114, 115 and 11n.

Specifically, according to one embodiment of the invention, it is presumed that the particular one device 111 belongs to a first category of devices, and the message handling node 120 is configured to check if the frequency criterion is fulfilled by comparing the first cumulative count $\Sigma e1(T_1)$ of error messages of the first type $T_1$ received from a further device 112 belonging to a second category of devices during the first previous period P1 with a second cumulative count threshold. If said first cumulative count $\Sigma e1(T_1)$ exceeds the second cumulative count threshold, the message handling node 120 is configured to send the at least one error report $E_{rep}$ indicating that the second cumulative count threshold has been exceeded by error messages of the first type $T_1$ from the further device 112. Thus, the level at which the at least one error report $E_{rep}$ shifts to the auxiliary type AUX can be set differently for the automatic devices of the first and second categories.

The automatic devices of the first and second categories may either represent devices of different kinds or the same kind. Hence, each of the first and second categories of devices may for example include an activity meter, a milk meter, a milking machine, a milking robot or milk extraction equipment for a milking point, a teat sensor, a TOF (time of flight) camera, a vacuum system, a manure handling system, an animal-identity system, a climate control system e.g. with fans and/or sprinklers, a fluid pressure sensor, a mechanical pressure sensor, a herd management system, a washing machine, a cooling system, a communication apparatus for remote communication, a gate system or a feeding system.

According to one embodiment of the invention, the message handling node 120 is configured to check if the frequency criterion is fulfilled by comparing a sum of the first cumulative counts $\Sigma e1(T_1)$ of the error messages of the first type $T_1$ received from said particular device 111 and said further device 112 during the first previous period P1 with a third cumulative count threshold. The magnitude of the third cumulative count threshold is different from a combined magnitude of the first and second cumulative count thresholds, i.e. third cumulative count threshold is either higher or lower than the first cumulative count threshold plus the second cumulative count threshold. If said sum of the first cumulative counts $\Sigma e1(T_1)$ of the error messages of the first type $T_1$ exceeds the third cumulative count threshold, the message handling node 120 is configured to send the at least one error report $E_{rep}$ indicating that the third cumulative count threshold has been exceeded by the error messages of the first type $T_1$ from said particular device 111 and said further device 112. Such a combined treatment of error messages in the message handling node 120 can be advantageous because although a particular amount of errors may be accepted for an individual automatic device, less than the sum of the individually acceptable cumulative counts may be tolerated for a group of automatic devices.

It is preferable if the message handling node 120 is configured to analyze the received error messages e1, e2, e3, e4, e5 and en to determine an estimated cause of the error messages e1, e2, e3, e4, e5 and/or en. Specifically, here, the received error messages e1, e2, e3, e4, e5 and/or en represent at least two different types of error messages and/or have been received from at least two different automatic devices 111, 112, 113, 114, 115 and/or 11n. Moreover, the message handling node 120 is configured to determine the estimated cause, i.e. a possible fault, based on a combination of at least two of said at least two the error messages e1, e2, e3, e4, e5 and/or en, for instance by applying a deterministic scheme, an algorithm based on an artificial neural network, a connectionist systems or a combination thereof. Namely, for instance, by studying a consecutive order in which different error messages occur and/or by studying how various combinations of error messages occur together conclusions can be drawn regarding a fault that causes these error messages e1, e2, e3, e4, e5 and/or en. First and second errors may be functionally related to one another. For example, a first error relating to a vacuum sensor that occurs in conjunction with a second error indicating failure to attach a teat cup may be caused by a faulty vacuum pressure level, which, in turn, may be the result of a malfunctioning vacuum system.

Often two or more automatic devices 111, 112, 113, 114, 115 and/or 11n are interrelated by being arranged to operate in a consecutive chain of actions. In such a case, error messages originating from an automatic device at a later position in the chain me be caused by an error in an automatic device at an earlier position in the chain. Consequently, it may be concluded that an earliest link in the chain is the cause of all the error messages e1, e2, e3, e4, e5 and/or en.

The message handling node 120 is further configured to present the estimated cause in the at least one error report $E_{rep}$ of the auxiliary type AUX. Thereby, the user gains valuable information about how the reported error may be corrected.

Typically, some kinds of errors are less critical than others. It is therefore advantageous if it is possible to differentiate between the error messages. According to one embodiment of the invention, the rules system RS prescribes that a subgroup of error messages of the error messages e1, e2, e3, e4, e5 and en pertains to critical alarms. If the message handling node 120 receives an error message in said subgroup, the message handling node 120 is configured to send out the at least one error report $E_{rep}$ with an indication of the critical alarm to which the error message pertains irrespective of whether said frequency criterion is fulfilled relating to a number of times per unit time the message handling node 120 receives said error message in said subgroup. In other words, an error message in said subgroup always passes through to the user terminal(s) 151 and/or 152.

As mentioned above, the farm management system may further include a control node 140. This node is configured to receive the at least one error report $E_{rep}$. Based thereon, the control node 140 is configured to generate at least one statistic report $E_{stat}$. The control node 140 is also configured to store the at least one statistic report $E_{stat}$ in a digital storage resource 145. Thereby, it is straightforward to analyze how the farm system performs in terms of when particular errors occur. Furthermore, a user may conclude that the error report(s) $E_{rep}$ should be generated based on different criteria. For instance, the user may want to elevate or lower at least one cumulative count threshold.

The first cumulative count threshold $e_{th}$, the second cumulative count threshold, the third cumulative count threshold and/or the emergency cumulative count threshold $e_{emg}$ in the light the statistic report(s) $E_{stat}$, so that he/she is expected to receive a reasonable number of error report $E_{rep}$, and at the same time does not risk missing any critical errors.

Therefore, according to one embodiment of the invention, the control node 140 is further configured to receive at least one programming command PC, for example from one of the user terminals 151 or 152, or from an administrator of the farm management system. In response to the at least one programming command PC, the control node 140 is configured to generate at least one rule adjustment instruction RA. The control node 140 is further configured to send the at least one rule adjustment instruction RA to the message handling node 120. When received in the message handling node 120, the at least one rule adjustment instruction RA is configured to alter the rules system RS that is applied to the error messages e1, e2, e3, e4, e5 and en received therein. Consequently, the filtering behavior of the message handling node 120 may be manipulated in a convenient and a straightforward manner.

Figure 4:
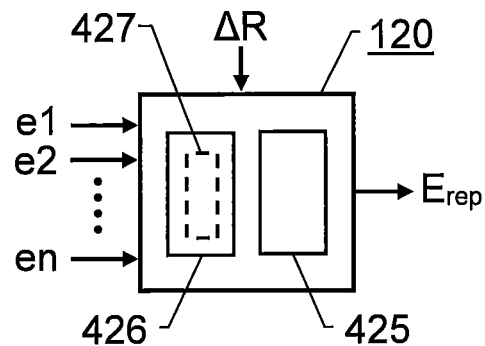
FIG. 4 shows a block diagram over a message handling node according to one embodiment the invention.

FIG. 4 shows a block diagram over a message handling node 120 according to one embodiment the invention. It is generally advantageous if the message handling node 120, which may be represented by a computer, a server or any other type of programmable data communication equipment, is configured to effect the above-described procedure in an automatic manner by executing a computer program 427. Therefore, the message handling node 420 may include a memory unit 426, i.e. non-volatile data carrier, storing the computer program 427, which, in turn, contains software for making processing circuitry in the form of at least one processor 425 in the message handling node 120 execute the above-described actions when the computer program 427 is run on the at least one processor 425.

Figure 5:
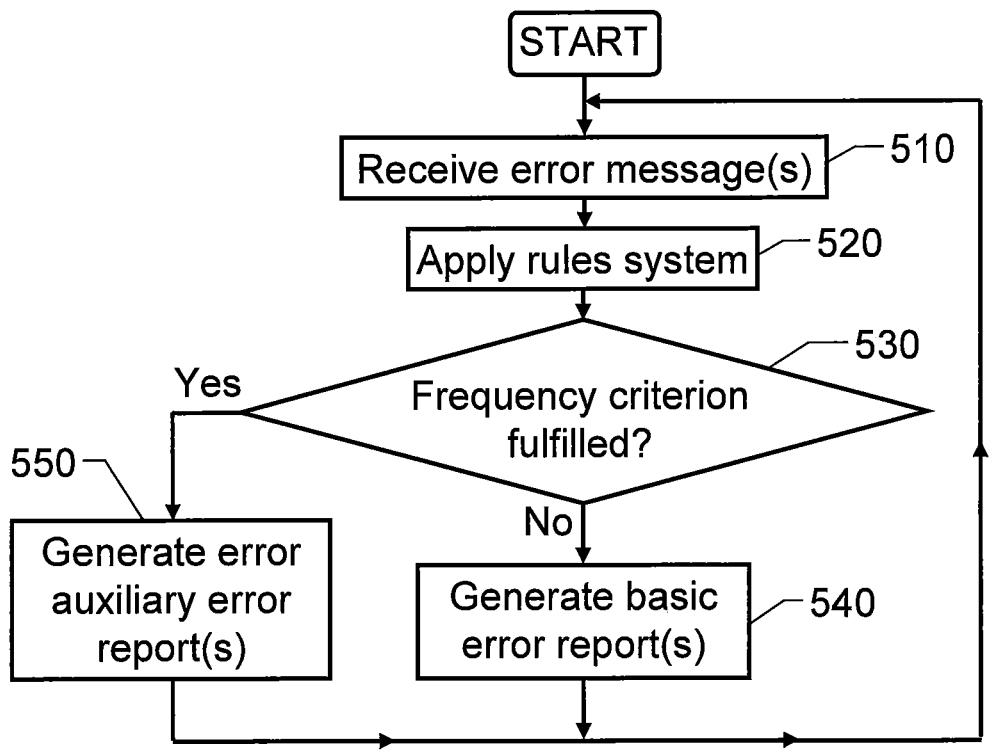
FIG. 5 illustrates, by means of a flow diagram, the general method according to the invention.

In order to sum up, and with reference to the flow diagram in FIG. 5, we will now describe the general computer-implemented farm management method according to the invention.

In a first step 510, at least one error message is received from a at least one automatic device. In a following step, 520, a rules system is applied to the received message(s). Then, a step 530 specifically checks a frequency criterion is fulfilled relating to a number of times at which the error messages from said particular one device are received within at least one previous period; and if so, a step 550 follows. Otherwise, the procedure continues to a step 540 in which a basic error report is forwarded to at least one user terminal. This may for example involve sending information about a current error count only if the first cumulative count $\Sigma e1(1)$ exceeds the first cumulative count threshold $e_{th_1}$. Thus, generating the basic error report may be an empty step meaning that nothing is sent to any user terminal. In step 550, an auxiliary error report is forwarded to at least one user terminal. This may for example involve sending at least one error report to at least one user terminal, which at least one error report indicates that the first count threshold has been exceeded by error messages of the first type from the particular one device. After step 540 or 550, the procedure loops back to step 510.

All of the process steps, as well as any sub-sequence of steps, described with reference to FIG. 5 may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal, which may be conveyed, directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A farm management system, comprising:
a message handling node (120) configured to:
receive error messages from a plurality of automatic devices,
generate at least one error report ($E_{rep}$) based on the received error messages, and
send the at least one error report ($E_{rep}$) to at least one user terminal,
wherein the message handling node (120) is configured to generate the at least one error report ($E_{rep}$) by applying a rules system (RS), which prescribes that the at least one error report ($E_{rep}$) concerns a particular one (111) of said automatic devices and is generated based on fulfillment of a frequency criterion relating to a count of a number of times that the message handling node (120) receives the error messages from said particular one automatic device (111) within at least one previous period of time, and
wherein the message handling node (120) is further configured to, when receiving a first error message of a first type ($T_1$) from said particular one automatic device (111):
check if said frequency criterion is fulfilled by comparing a first cumulative count ($\Sigma e1(T_1)$) of error messages of the first type ($T_1$) received from the particular one automatic device (111) during a first previous period (P1) with a first cumulative count threshold ($e_{th}$),
and if said first cumulative count ($\Sigma e1(T_1)$) exceeds the first cumulative count threshold ($e_{th}$), send the at least one error report ($E_{rep}$), indicating that the first cumulative count threshold ($e_{th}$) has been exceeded by error messages of the first type ($T_1$) from said particular one automatic device (111).

2. The system according to claim 1,
wherein the system sends the at least one error report ($E_{rep}$), indicating that the first cumulative count threshold ($e_{th}$) has been exceeded by error messages of the first type ($T_1$) from said particular one automatic device (111) only if said first cumulative count ($\Sigma e1(T_1)$) exceeds the first cumulative count threshold ($e_{th}$).

3. The system according to claim 1, wherein the message handling node (120) is further configured such that:
if said first cumulative count ($\Sigma e1(T_1)$) exceeds the first cumulative count threshold ($e_{th}$) at a first point in time ($t_{13}$), the message handling node (120) sends, after the first point in time ($t_{13}$), the at least one error report ($E_{rep}$), indicating that the first cumulative count ($\Sigma e1(T_1)$) of error messages of the first type ($T_1$) has been received from the particular one automatic device (111) during a second previous period (P2), said at least one error report ($E_{rep}$) being sent only at predefined points in time ($t_{20}$).

4. The system according to claim 1, wherein the message handling node (120) is further configured to set the first cumulative count threshold ($e_{th}$) dynamically, based on a time parameter, such that a duration of the first previous period (P1) is different at different times of day.

5. The system according to claim 1,
wherein said particular one automatic device (111) belongs to a first category of devices within said plurality of automatic devices, and
wherein the message handling node (120) is further configured to:
compare the first cumulative count ($\Sigma e1(T_1)$) of error messages of the first type ($T_1$) received from a further automatic device (112) belonging to a second category of devices within said number of automatic devices during the first previous period (P1) with a second cumulative count threshold, and if said first cumulative count ($\Sigma e1(T_1)$) exceeds the second cumulative count threshold, send the at least one error report ($E_{rep}$), indicating that the second cumulative count threshold has been exceeded by error messages of the first type ($T_1$) from said further automatic device (112).

6. The system according to claim 5, wherein the message handling node (120) is further configured to:

compare a sum of the first cumulative counts ($\Sigma e1(T_1)$) of the error messages of the first type ($T_1$) received from said particular automatic device (111) and said further automatic device (112) during the first previous period (P1) with a third cumulative count threshold that is different from a combined magnitude of the first and second cumulative count thresholds, and if said sum of the first cumulative counts ($\Sigma e1(T_1)$) exceeds the third cumulative count threshold, send the at least one error report ($E_{rep}$), indicating that the third cumulative count threshold has been exceeded by error messages of the first type ($T_1$) from said particular automatic device (111) and said further automatic device (112).

7. A farm management system, comprising:

a message handling node (120) configured to:

receive error messages from a plurality of automatic devices, generate at least one error report ($E_{rep}$) based on the received error messages, and send the at least one error report ($E_{rep}$) to at least one user terminal, wherein the message handling node (120) is configured to generate the at least one error report ($E_{rep}$) by applying a rules system (RS), which prescribes that the at least one error report ($E_{rep}$) concerns a particular one (111) of said automatic devices and is generated based on fulfillment of a frequency criterion relating to a count of a number of times that the message handling node (120) receives the error messages from said particular one automatic device (111) within at least one previous period of time, and wherein the message handling node (120) is further configured to:

analyze the received error messages, said received error messages representing at least two different types of error messages and/or have been received from at least two different automatic devices, and determine from said received error messages an estimated cause of a combination of at least two of said at least two the error messages, and present the estimated cause in the at least one error report ($E_{rep}$).

8. The system according to claim 1, wherein the rules system (RS) prescribes that a subgroup of error messages of said error messages pertains to critical alarms, and wherein the message handling node (120) is further configured such that if the message handling node (120) receives an error message in said subgroup, the message handling node (120) sends out the at least one error report ($E_{rep}$), with an indication of the critical alarm to which the error message pertains irrespective of whether said frequency criterion is fulfilled relating to a number of times per unit time the message handling node (120) receives said error message in said subgroup.

9. The system according to claim 1, further comprising:

a control node (140), configured to:

receive the at least one error report ($E_{rep}$), generate at least one statistic report ($E_{stat}$) based on the at least one error report ($E_{rep}$), and store the at least one statistic report ($E_{stat}$) in a digital storage resource (145).

10. The system according to claim 9, wherein the control node (140) is further configured to:

receive at least one programming command (PC), and in response thereto, generate at least one rule adjustment instruction (R$\Delta$) and send the at least one rule adjustment instruction (R$\Delta$) to the message handling node (120), said at least one rule adjustment instruction (R$\Delta$) being configured to alter the rules system (RS) applied to the error messages received in the message handling node (120).

11. The system according to claim 1, wherein the message handling node (120) is configured to:

check if an emergency criterion is fulfilled by comparing the first cumulative count ($\Sigma e1(T_1)$) of error messages of the first type ($T_1$) received from the particular one automatic device (111) during the first previous period (P1) with an emergency cumulative count threshold ($e_{emg}$) above the first cumulative count threshold ($e_{th}$), and if said first cumulative count ($\Sigma e1(T_1)$) exceeds the emergency cumulative count threshold ($e_{emg}$), send the at least one error report ($E_{rep}$) indicating that the emergency cumulative count threshold ($e_{emg}$) has been exceeded by error messages of the first type ($T_1$) from said particular one automatic device (111).

12. A computer-implemented method performed in a farm management system, the method comprising:

receiving error messages from a number of automatic devices;

generating at least one error report ($E_{rep}$) based on the received error messages, wherein said generating the at least one error report ($E_{rep}$) includes applying a rules system (RS), which prescribes that the at least one error report ($E_{rep}$) concerns a particular one (111) of said automatic devices and is generated based on fulfillment of a frequency criterion relating to a count of a number of times that the error messages from said particular one device (111) are received within at least one previous period of time;

sending the at least one error report ($E_{rep}$) to at least one user terminal (151, 152);

receiving a first error message of a first type ($T_1$) from said particular one automatic device (111);

determining that said frequency criterion is fulfilled by comparing a first cumulative count ($\Sigma e1(T_1)$) of error messages of the first type ($T_1$) received from the particular one automatic device (111) during a first previous period (P1) with a first cumulative count threshold ($e_{th}$);

determining that said first cumulative count ($\Sigma e1(T_1)$) exceeds the first cumulative count threshold ($e_{th}$); and sending the at least one error report ($E_{rep}$), indicating that the first cumulative count threshold ($e_{th}$) has been exceeded by error messages of the first type ($T_1$) from said particular one automatic device (111).

13. The method according to claim 12, wherein the step of sending the at least one error report ($E_{rep}$) indicating that the first cumulative count threshold ($e_{th}$) has been exceeded by error messages of the first type ($T_1$) from said particular one automatic device (111) is performed only if said first cumulative count ($\Sigma e1(T_1)$) exceeds the first cumulative count threshold ($e_{th}$).

14. The method according to claim 12, further comprising:
    determining that said first cumulative count ($\Sigma e1(T_1)$) exceeds the first cumulative count threshold ($e_{th}$) at a first point in time ($t_{13}$); and
    after the first point in time ($t_{13}$), sending the at least one error report ($E_{rep}$), indicating that the first cumulative count ($\Sigma e1(T_1)$) of error messages of the first type ($T_1$) has been received from the particular one automatic device (111) during a second previous period (P2), said at least one error report ($E_{rep}$) being sent only at predefined points in time ($t_{20}$).

15. The method according to claim 12, further comprising:
    setting the first cumulative count threshold ($e_{th}$) dynamically, based on a time parameter such that a duration of the first previous period (P1) is different at different times of the day.

16. The method according to claim 12,
    wherein said particular one automatic device (111) belongs to a first category of devices within said number of automatic devices,
    and the method further comprises:
    comparing the first cumulative count ($\Sigma e1(T_1)$) of error messages of the first type ($T_1$) received from a further automatic device (112) belonging to a second category of devices within said number of automatic devices during the first previous period (P1) with a second cumulative count threshold;
    determining that said first cumulative count ($\Sigma e1(T_1)$) exceeds the second cumulative count threshold; and
    sending the at least one error report ($E_{rep}$) indicating that the second cumulative count threshold has been exceeded by error messages of the first type ($T_1$) from said further automatic device (112).

17. The method according to claim 16, further comprising:
    comparing a sum of the first cumulative counts ($\Sigma e1(T_1)$) of the error messages of the first type ($T_1$) received from said particular automatic device (111) and said further automatic device (112) during the first previous period (P1) with a third cumulative count threshold that is different from a combined magnitude of the first and second cumulative count thresholds;
    determining that said sum of the first cumulative counts ($\Sigma e1(T_1)$) exceeds the third cumulative count threshold; and
    sending the at least one error report ($E_{rep}$), indicating that the third cumulative count threshold has been exceeded by error messages of the first type ($T_1$) from said particular automatic device (111) and said further automatic device (112).

18. A computer-implemented method performed in a farm management system, the method comprising:
    receiving error messages from a number of automatic devices;
    generating at least one error report ($E_{rep}$) based on the received error messages, wherein said generating the at least one error report ($E_{rep}$) includes applying a rules system (RS), which prescribes that the at least one error report ($E_{rep}$) concerns a particular one (111) of said automatic devices and is generated based on fulfillment of a frequency criterion relating to a count of a number of times that the error messages from said particular one device (111) are received within at least one previous period of time;
    sending the at least one error report ($E_{rep}$) to at least one user terminal (151, 152);
    analyzing the received error messages, said received error messages representing at least two different types of error messages and/or have been received from at least two different automatic devices; and
    determining from said received error messages an estimated cause of a combination of at least two of said at least two the error messages; and
    presenting the estimated cause in the at least one error report ($E_{rep}$).

19. The method according to claim 12,
    wherein the rules system (RS) prescribes that a subgroup of error messages of said error messages pertains to critical alarms,
    and the method further comprises:
    receiving at the message handling node (120) an error message in said subgroup; and
    sending out the at least one error report ($E_{rep}$), with an indication of the critical alarm to which the error message pertains irrespective of whether said frequency criterion is fulfilled relating to a number of times per unit time the message handling node (120) receives said error message in said subgroup.

20. The method according to claim 12, further comprising:
    checking whether an emergency criterion is fulfilled by comparing the first cumulative count ($\Sigma e1(T_1)$) of error messages of the first type ($T_1$) received from the particular one automatic device (111) during the first previous period (P1) with an emergency cumulative count threshold ($e_{emg}$) above the first cumulative count threshold ($e_{th}$);
    determining that said first cumulative count ($\Sigma e1(T_1)$) exceeds the emergency cumulative count threshold ($e_{emg}$); and
    sending the at least one error report ($E_{rep}$) indicating that the emergency cumulative count threshold ($e_{emg}$) has been exceeded by error messages of the first type ($T_1$) from said particular one automatic device (111).

21. A non-transitory data medium (426) having recorded thereon a computer program (427) that, upon execution by a processor of a computer, executes the method according to claim 12.

22. A non-transitory data medium (426) having recorded thereon a computer program (427) that, upon execution by a processor of a computer, executes the method according to claim 13.

23. A non-transitory data medium (426) having recorded thereon a computer program (427) that, upon execution by a processor of a computer, executes the method according to claim 18.

* * * * *